(12) United States Patent
Faitelson et al.

(10) Patent No.: US 9,195,759 B2
(45) Date of Patent: Nov. 24, 2015

(54) METHOD AND APPARATUS FOR ENTERPRISE-LEVEL FILTERED SEARCH

(75) Inventors: Yakov Faitelson, Elkana (IL); Ohad Korkus, Herzeliya (IL); Ophir Kretzer-Katzir, Re'ut (IL); David Bass, Karmei Yosef (IL)

(73) Assignee: VARONIS SYSTEMS, LTD., Herzliya (IL)

( * ) Notice: Subject to any disclaimer, the term of this patent is extended or adjusted under 35 U.S.C. 154(b) by 0 days.

(21) Appl. No.: 13/430,710

(22) Filed: Mar. 27, 2012

(65) Prior Publication Data

US 2013/0263221 A1    Oct. 3, 2013

(51) Int. Cl.
*G06F 17/30*    (2006.01)
*G06F 21/62*    (2013.01)

(52) U.S. Cl.
CPC ...... *G06F 17/30867* (2013.01); *G06F 21/6218* (2013.01)

(58) Field of Classification Search
CPC ................ G06F 17/30867; G06F 21/6218
USPC ............................................. 726/4, 18, 21, 27
See application file for complete search history.

(56) References Cited

U.S. PATENT DOCUMENTS

| | | | |
|---|---|---|---|
| 5,729,734 A * | 3/1998 | Parker et al. ........................... 1/1 |
| 8,327,419 B1 * | 12/2012 | Korablev et al. .................. 726/2 |
| 8,572,511 B1 * | 10/2013 | Barnett et al. ................. 715/848 |
| 2001/0027451 A1 * | 10/2001 | Taguchi et al. .................... 707/3 |
| 2002/0059236 A1 * | 5/2002 | Satoh ................................. 707/9 |
| 2002/0169843 A1 * | 11/2002 | Tsuneda ....................... 709/206 |
| 2003/0105978 A1 * | 6/2003 | Byrne ........................... 713/201 |
| 2003/0154221 A1 | 8/2003 | Caronni |
| 2007/0033191 A1 * | 2/2007 | Hornkvist et al. ................. 707/9 |
| 2007/0233647 A1 * | 10/2007 | Rawat et al. ...................... 707/3 |
| 2008/0066157 A1 * | 3/2008 | Stevens et al. .................... 726/4 |
| 2008/0140808 A1 * | 6/2008 | Lee et al. ...................... 709/219 |
| 2008/0306954 A1 * | 12/2008 | Hornqvist .......................... 707/9 |
| 2010/0010998 A1 | 1/2010 | Wagner |
| 2010/0095354 A1 * | 4/2010 | Uchida et al. ..................... 726/4 |
| 2010/0174709 A1 * | 7/2010 | Hansen et al. ................. 707/728 |
| 2010/0174751 A1 | 7/2010 | Kawano |
| 2011/0161091 A1 * | 6/2011 | Freishtat et al. ............... 705/1.1 |
| 2011/0225627 A1 * | 9/2011 | Uchida et al. ..................... 726/3 |
| 2011/0265189 A1 * | 10/2011 | Liao et al. ....................... 726/28 |
| 2013/0074158 A1 * | 3/2013 | Koskimies et al. ............... 726/4 |
| 2013/0232552 A1 * | 9/2013 | Brush et al. ....................... 726/4 |

FOREIGN PATENT DOCUMENTS

EP            2182453 A1 *    5/2010    ............. G06F 17/30

* cited by examiner

*Primary Examiner* — Matthew Smithers
(74) *Attorney, Agent, or Firm* — Soroker-Agmon

(57) ABSTRACT

A method for a secure search in a computerized system having a storage, comprising searching for objects in the storage of the computerized system according to search criteria provided by a user wherein the criteria comprise at least one attribute of the objects, identifying objects that meet the criteria and displaying representations respective of identified objects that are accessible to the user, and an apparatus for performing the same.

22 Claims, 5 Drawing Sheets

METHOD AND APPARATUS FOR ENTERPRISE-LEVEL FILTERED SEARCH

RELATED APPLICATIONS

Reference is made to U.S. application Ser. No. 12/673,691, having an at least one common inventor with the present application, which is a national phase of international application No. PCT/IL2010/000069 filed on 27 Jan. 2010, that reports a system for identifying data of interest from among a multiplicity of data elements residing on multiple platforms in an enterprise, the system including background data characterization functionality characterizing the data of interest at least by at least one content characteristic thereof and at least one access metric thereof.

BACKGROUND

The present disclosure generally relates to a search in a computerized system, and more specifically to presentation of the search results.

Searching in a computerized system for stored or linked items is known in the art, such as services by Google© or Yahoo© or by other search engines. Generally, such search services present any item that is found according to one or more keywords or search phrases.

In some cases, such as in multi-node systems, data elements of a system are searched or crawled over, and reference to contents of the data elements are stored such as by an index, allowing subsequent queries for contents of the data elements. Additionally, in some cases, other information or attributes of the data elements are obtained and/or maintained, such as access history to the data elements and/or access rights to the data elements by users of the system, and may be subsequently used in conjunction with queries. Analogous functionality is reported, for example, in US Application No. 2009/0265780 to Korkus et al. or in an international publication No. WO2011/030324 to Korkus et al.

SUMMARY

One exemplary embodiment of the disclosed subject matter is a method for a secure search in a computerized system having a storage, comprising searching for objects in the storage of the computerized system according to search criteria provided by a user wherein the search criteria comprising at least one attribute of the objects, identifying objects that meet the criteria and displaying representations respective of identified objects that are accessible to the user.

Another exemplary embodiment of the disclosed subject matter is an apparatus for a secure search, comprising a computerized system comprising an at least one computer and an at least one data storage device, and an at least one program operative in the computerized system and configured for:

searching for objects in the at least one data storage device according to search criteria provided by a user, the criteria comprising at least one attribute of objects;

identifying objects that meet the criteria; and displaying representations of identified objects that are accessible to the user.

In some embodiments, the criteria comprise at least permissions of the user with respect to the objects.

In the context of the present disclosure, without limiting, the term 'enterprise' implies a computerized system comprising a plurality of computers communicating therebetween and having and/or sharing a data storage, where the enterprise is also referred to as a 'computerized system' and the data storage also referred to as a 'storage'.

The communications between the computes may be direct and/or indirect. The data storage comprises one or more data storage devices.

Generally, without limiting, an enterprise comprises several computers in a range between about 10 computers and about 1000 computers or more. Optionally, an enterprise comprises less than 10 computers, not precluding having one computer as, for example, a mainframe computer.

Without limiting, in the context of the present disclosure with respect to an enterprise, the term 'object' implies a data object, such as a file or folder, stored on the storage of the enterprise and also referred to as an object of the enterprise.

In the context of the present disclosure, without limiting, the term 'user' or 'operator' implies a person, and/or a program operating on behalf of the person, that uses a resource of an enterprise, such as a computer of the enterprise. A user or operator is also referred to as user of the enterprise or operator of the enterprise, respectively.

In the context of the present disclosure, without limiting, the term 'access right' or 'rights' or 'sufficient rights' imply authorization for a user to access an object of an enterprise, whereas insufficient rights imply not having an authorization to access the object such as for opening or reaching the object for viewing. Referring generally or collectively to permissions implies any kind of authorization including, possibly, sufficient and/or insufficient rights.

Generally and without limiting, the authorization or permissions, and/or other attributes such as classifications, are set by the management or administration of the enterprise and/or by owners of objects of the enterprise and/or by operators with special high level authorization, also known as super-users or administrators.

In the context of the present disclosure, without limiting, the term 'owner' of an object implies a user that has authority and/or access rights to an object so that he or she may grant or authorize access to the object to users not having sufficient rights for the object. Without limiting, a person and/or a program and/or any entity operative or operating on behalf on an owner of an object and authorized to grant rights to the object is also considered or regarded as the owner. The access may be granted on an ad-hoc basis or any other basis such as time-limited, user dependent of permanently.

In the context of the present disclosure, without limiting, the term 'crawl' implies browsing or exploring objects and contents thereof in a storage of an enterprise, thereby indexing data pertaining to the objects and contents thereof in one or more data structures collectively referred to as an 'index'. The crawling is generally conducted by one or more programs operating on one or more computers.

Generally, indexing implies storing in an index information such as and/or relating to file names and elements of contents of files, such textual phrases and/or constructs and/or keywords.

In the context of the present disclosure, without limiting, attributes of objects, such as metadata or other information relating to objects, are collected and stored in one or more databases. For example, permissions for users or activity history or other metadata of the objects such as classifications are collected and stored, such as in databases respective to the metadata.

The attributes are obtained and/or determined by crawling and/or tracking and/or responsive to events by one or more computer programs that track and/or monitor activities in an enterprise, such as by event monitors or activity loggers or any other technique such as by the operating system.

Generally, crawling is performed as a continuous or periodic background operation, optionally performed parallelly on a plurality of storage devices of the enterprise.

The terms cited above denote also variations and conjugates thereof.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Figure 1:
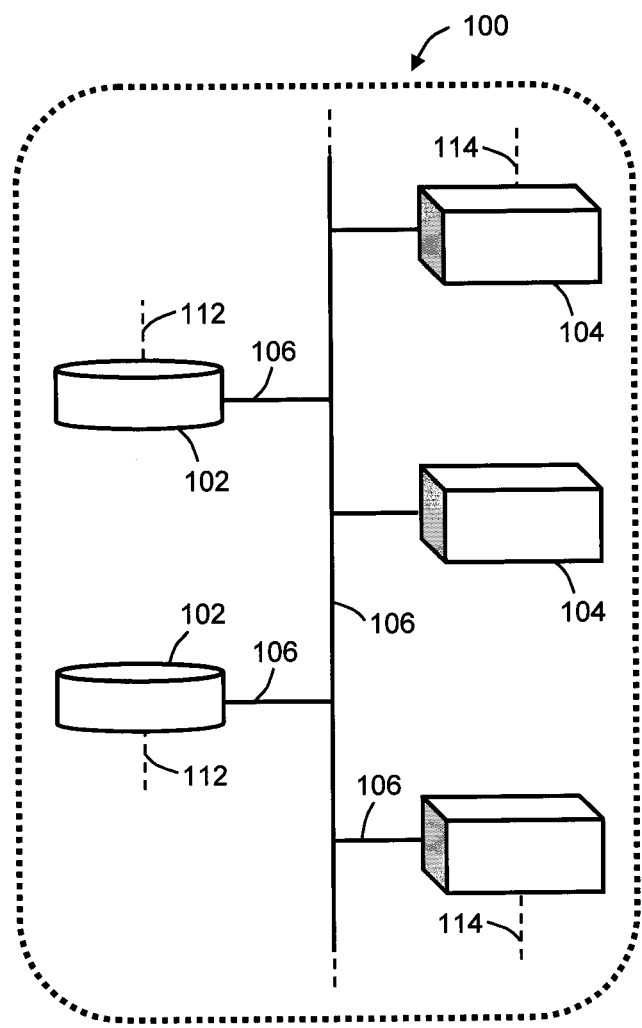

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

Figure 2:
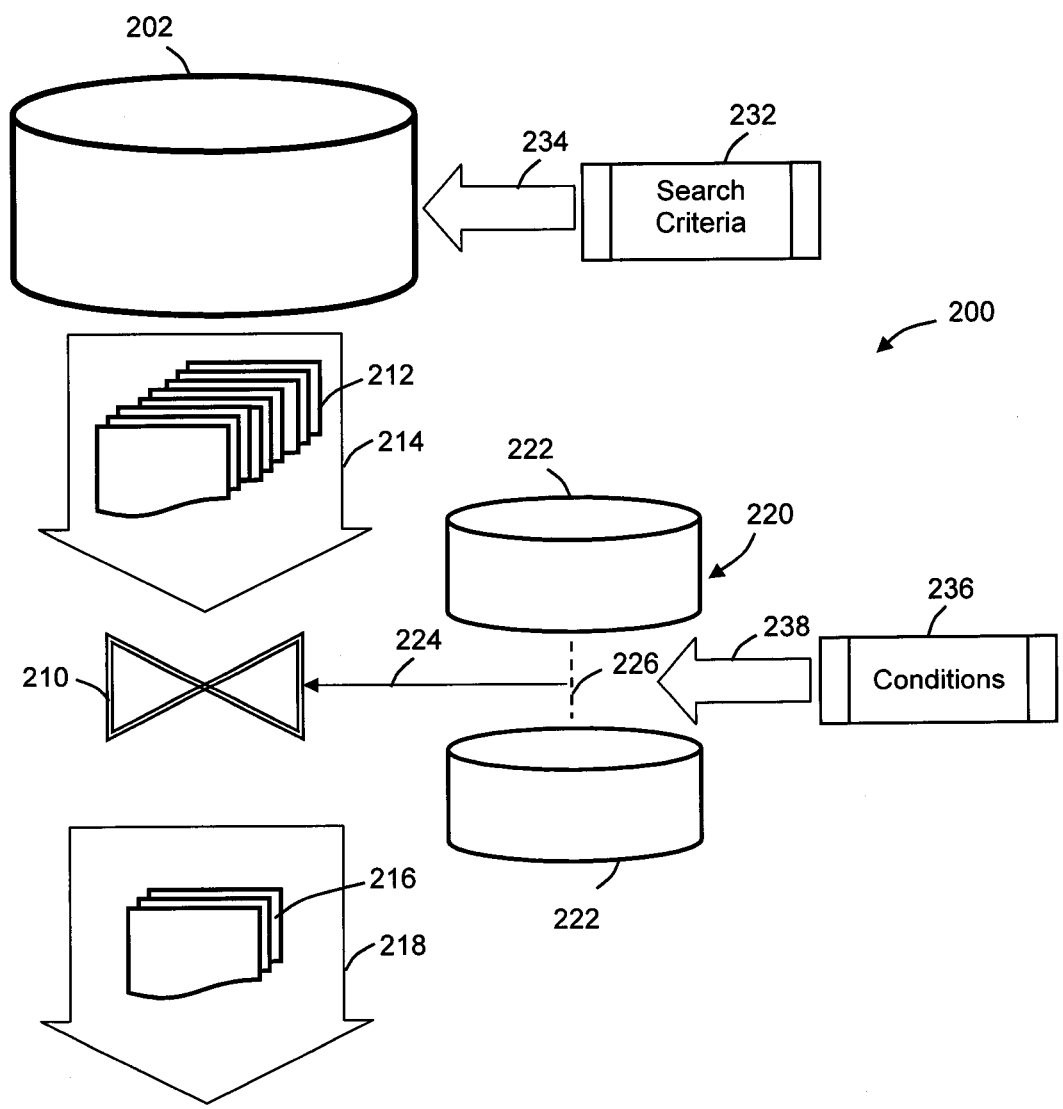
Figure 3:
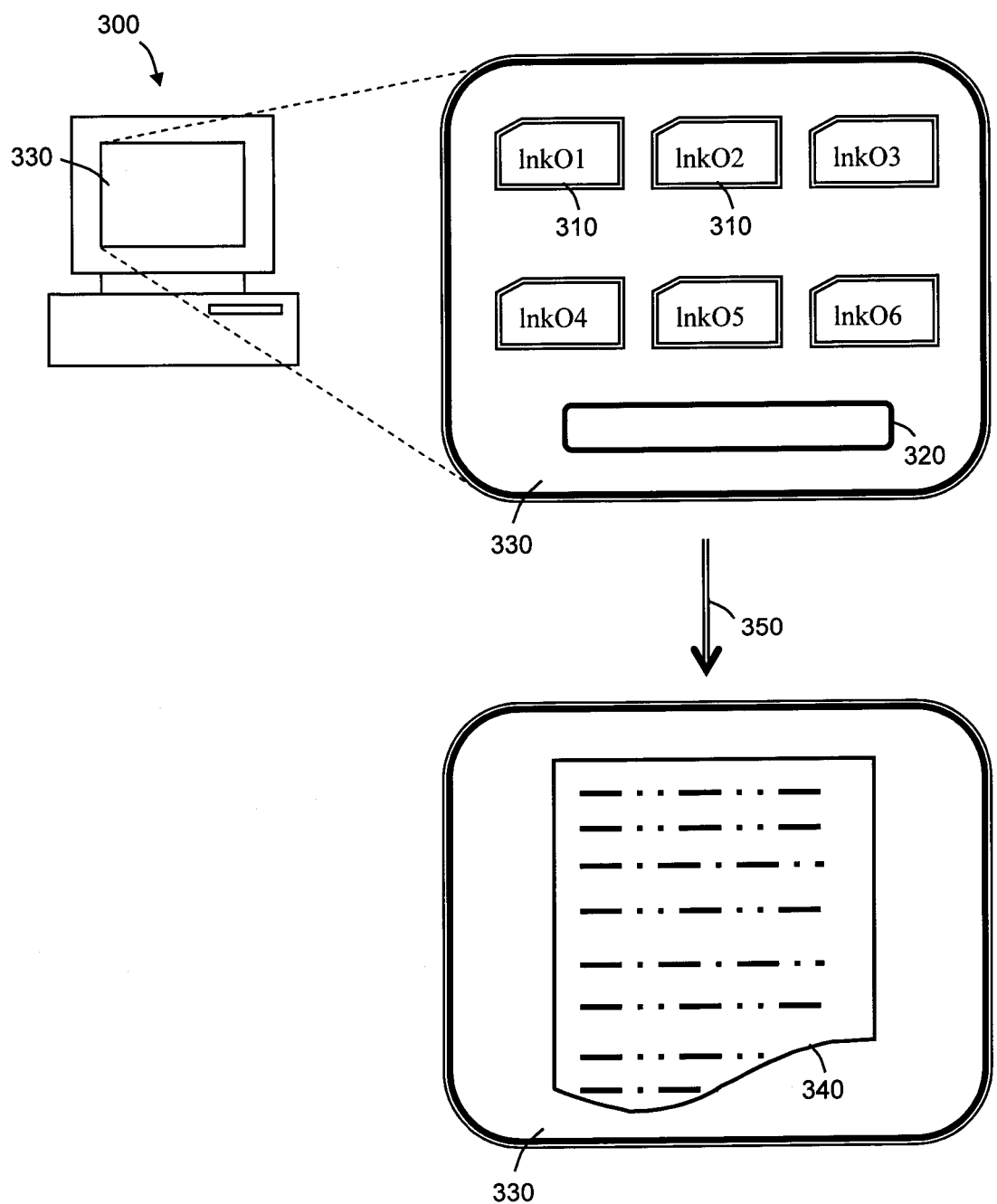
Figure 4A:
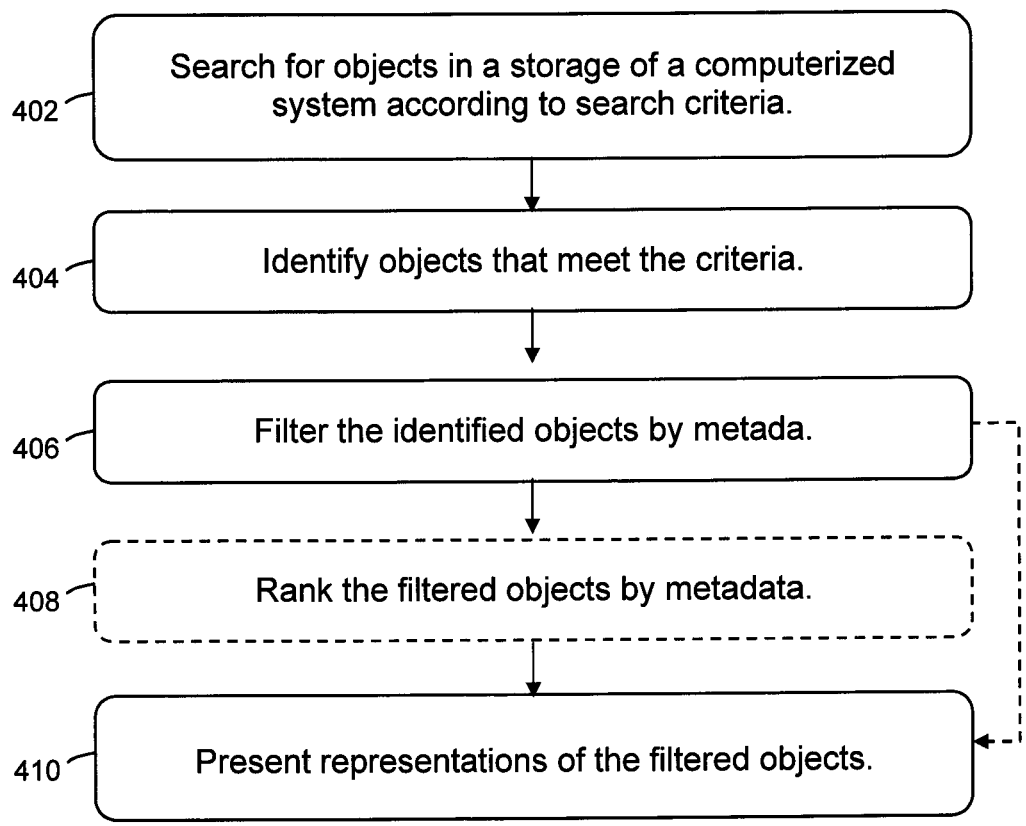
Figure 4B:
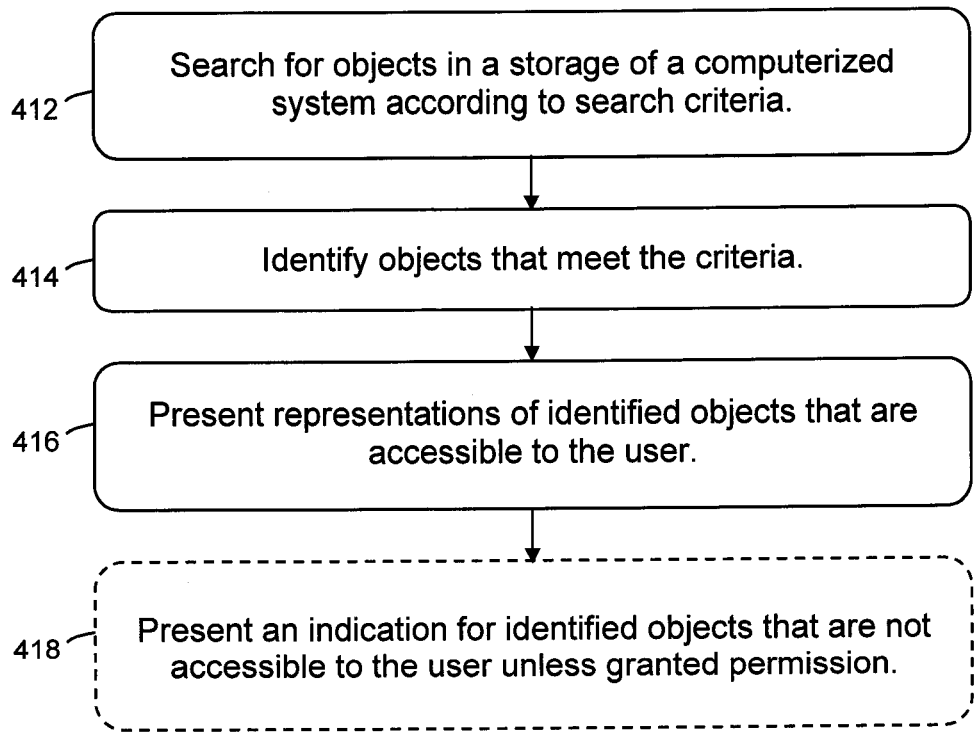

FIG. 1 schematically illustrates an enterprise comprising one or more computers, illustrated as three computers representing any number of computers, according to exemplary embodiments of the disclosed subject matter;

FIG. 2 schematically illustrates a reference sub-system of an enterprise and a referencing mechanism, according to exemplary embodiments of the disclosed subject matter;

FIG. 3 schematically illustrates a computer having a screen and a program or programs of displaying representations of objects and activation of the corresponding objects, according to exemplary embodiments of the disclosed subject matter; and FIG. 4 outlines operations for a secure search, according to exemplary embodiments of the disclosed subject matter.

DETAILED DESCRIPTION

One technical problem dealt by the disclosed subject matter is securely presenting results of a search for objects of an enterprise by certain criteria, preventing unauthorized access to objects identified in the search.

One technical solution according to the disclosed subject matter is a computer of, or linked to, the enterprise and configured to identify objects of the enterprise responsive to a query, and consequently present, such as by filtering objects that meet the query, representation of objects only for which a user has access rights.

Subsequently, in some embodiments, the user may activate the presented representation and access the objects, thus prevented from accessing objects for which the user has insufficient rights.

Additionally, in some embodiments, the computer is configured to present an indication that objects for which the user has insufficient rights did also match the search criteria. Subsequently, the user may activate the indication, thereby notifying owners of the objects to the effect that access rights are requested for the objects for which the user has insufficient rights. The owners may or may not provide the user with access rights for a least a subset of the objects.

A potential technical effect of the disclosed subject matter is a secure enterprise-level search for objects of the enterprise, where the results are filtered and presented according to a user's access rights and/or lack thereof. Thus, a user cannot access an object for which the user does not have sufficient rights unless, optionally, granted an access right by the owner of the object or by a program operating on behalf of the owner and/or by a person with sufficient rights at least equivalent or equal to those of the owner of the object.

In the context of the present disclosure, without limiting, a link to an object is a data entity that facilitates or mediates access or connection to an object. The link comprises, for example, the network address of the object, such Universal Naming Convention (UNC), the location of the object on a storage device, or the IP or equivalent thereof of the object on a remote server.

For brevity and clarity and without limiting, in the present disclosure referring to presented or displayed objects implies also and/or alternatively representations of the objects and/or links to the objects. Thus, activation of an object implies activation of the object per se as presented, and/or via a representation of the object such as a graphical symbol, and/or via a link to the object where the link may also be represented by some visual symbol.

In some embodiments, in addition and/or instead of using permissions as a condition for identifying objects, objects are identified and presented according to other attributes or metadata or rules, and, optionally, in addition to permissions.

In some embodiments, the objects are presented according to one or more rules and/or conditions. For example, the objects are ranked or ordered according to one or more attributes of the objects, such as classification or owners of the objects, optionally in a hierarchical order.

A general non-limiting overview of practicing the present disclosure is presented below. The overview outlines exemplary practice of embodiments of the present disclosure, providing a constructive basis for variant and/or alternative and/or or divergent embodiments, some of which are subsequently described.

In some embodiments, a user of the enterprise can or may operate a computer connected or linked to a display device such as a monitor, and a pointing device such as a mouse. The computer is configured with a program or programs for displaying and activating objects and/or representations thereof displayed on the display device, such as or akin to a desktop of Graphical User Interface (GUI) or a web-browser. In some embodiments, the display device is a touch-screen and a finger of a user may operate as a pointing device.

In some embodiments, the storage of the enterprise is crawled and objects of the enterprise are explored. Encountered or found or identified objects are indexed according contents of the objects and other data related to the objects, including, in some embodiments, permissions of users of the enterprise, access history of the objects by users of the enterprise, classifications of the objects or owners of the objects, or any combination and/or any portion thereof In some embodiments, the crawling is an ongoing process, optionally incrementally updating the index according to changes of objects and/or other data related to the objects, such as new objects, modified objects or modified data related to the objects such as modified permissions.

In some embodiments, subsequent to and/or parallelly with and/or concurrently with crawling and indexing the objects, a user instantiates a search for objects. Based on the index, the search is conducted according certain constraints or criteria, collectively referred to also as search criteria. The search criteria include, for example, keywords and/or phrases and/or 'wildcards' or regular expressions and/or logical expressions. Optionally or additionally, the search criteria include rules for identifying objects.

In some embodiments, objects that meet the search criteria and at least one further condition are identified. The further condition relates to attributes of the objects and/or metadata of the object. In some embodiments, the at least one further condition comprises a plurality of conditions. In some embodiments, the objects are identified by detecting objects that meet the search criteria, and filtering out the objects that meet the condition or conditions. Optionally or alternatively, objects that meet the one or more conditions are identified, regardless or search criteria.

For example, a condition relates to constraints on permissions of a user with respect to the objects such that only objects for which the user has access rights are indentified, or a condition relates to activity history of the objects such that only objects that meet a constraint of the activity are identified, or a condition related to a combination of permission and activity history.

In some embodiments, the identified objects and/or links thereto and/or representations thereof are presented such as on a display device. The user may activate the presented objects and access only the objects for which the user has sufficient access rights.

Optionally or additionally, objects for which the user does not have sufficient access rights are identified and presented collectively by an indication such as a message and/or a symbol. The user may activate the indication, and, responsively, owners of the objects for which the user does not have sufficient access rights are notified and may grant the user access rights to access the object.

In some embodiments, the owners of the objects for which the user does not have sufficient access rights, and/or programs operating on behalf thereof, provide access to the objects accompanied by presentations of the objects. Optionally or alternatively, the owners may otherwise grant the access rights by other means, such as by email or SMS or other means such as by Instant Messaging.

In some embodiments, granting access to an object for which the user does not have sufficient rights is ad-hoc or temporary, such as allowing accessing the object once. Optionally or alternatively, the grant is time limited and/or permanent.

In some embodiments, the owner explains or justifies why access rights are granted, where, optionally, the granting the rights and/or justification is recorded in the enterprise storage and optionally indexed.

In some embodiments, activation of an object or a representation thereof is carried out by pointing at an object and/or representation thereof at the display device and pressing a keyboard key such as 'Enter' and/or clicking a mouse key and/or tapping on a touch-pad.

In some embodiments, the activation of an object or a representation thereof results in accessing the object according to the type or nature of the object. For example, opening a file, or connecting to a web-page or running a program.

Thus, a secure search is provided so that the search results, as objects of the enterprise, are secured for access only to users that have sufficient access rights thereto. Access to objects to which the users have insufficient access rights is not allowed unless the users were granted access rights by owners of the objects and/or entities such as a programs or persons operating on behalf of the owners.

In some embodiments, the search results are ordered according to one or more attributes and/or metadata of the identified objects. For example, by owners of the objects, with management owners appearing before objects with other owners.

In some embodiments, exploring the storage of an enterprise and/or searching for objects of the enterprise are operable or configured for coupling or integration with other search mechanism of the enterprise, such as integration with a textual search.

In some embodiments, the indexing of the objects is operable or configured for coupling or integration with other indexes such as those obtained from textual or classification indexing of the enterprise.

In some embodiments, the crawling or exploring for objects of the enterprise and consequent indexing the objects and the users' permissions thereof is an ongoing repeated or continuous process, and the index is, optionally, updated responsive to changes in the storage of the enterprise, such as additions or deletions of users, additions or deletion of objects or modifying objects permissions. In some embodiments, the crawling or exploring is operated or executed in parallel to other tasks or processes of the enterprise, and is, optionally, divided among a plurality of computers or processors such as by threads or tasks of the same process.

It is also noted that an object may have different permissions for a plurality of users, for example, one user may have overall permissions whereas another user may have no permission to access the object.

It is noted that, generally, there is an ongoing, activity of crawling the storage of the enterprise for indexing of objects and contents thereof, and a separate activity for obtaining and storing of attributes and/or metadata of objects.

FIG. 1 schematically illustrates an enterprise 100 comprising one or more computers, illustrated as three instances of a computer 104, representing any number of computer 104, as indicated by dashed lines 114.

Enterprise 100 further comprises one or more data storage devices, illustrated as two instances of a data storage device 102, representing any number of data storage device 102, as indicated by dashed lines 112. Data storage device 102 generally stores objects or data entities such as files or database records or users definitions or similar elements, collectively referred to also as objects.

The instances of computer 104 are connected or linked or coupled therebetween and to the instances of data storage device 102, the connection or linkage illustrated and represented by a network 106.

FIG. 2 schematically illustrates a reference sub-system 200 of an enterprise and a referencing mechanism, according to exemplary embodiments of the disclosed subject matter.

Reference sub-system 200 comprises an index 202 that stores references to objects of the enterprise and contents thereof, and a group 220 comprising one or more of stores of attributes and/or metadata of the objects, collectively referred to as attributes, illustrated as two instances of a store 222, representing any number of store 222, as indicated by dashed lines 226. Anyone of store 222 holds or stores retrievable attributes of a kind, such as permissions of users with respect to objects of the enterprise, classifications of objects of the enterprise, activity history of objects of the enterprise, and so forth.

A query 232 comprising search criteria for identifying objects is fed or provided to index 202, as illustrated in an arrow 234. According to query 232, by way of index 202, objects 212 that meet the search criteria is obtained, as illustrated by an arrow 214.

Subsequently, an inquiry 236 comprising conditions for attributes is fed or provided to group 220, as indicated by an arrow 238. According to the conditions, group 220 provides a filter as indicated schematically by an arrow 224 and a filter 210, respectively.

Filter 210 accepts objects 212 that meet the search criteria, and filters out objects 216 that meet or conform to the conditions provided in inquiry 236, as indicated by an arrow 218.

In some embodiments, filter 210 stands for a process where for each of objects 212 that meet the search criteria, group 220 is consulted and checked whether the attributes meet the conditions of inquiry 236, selection and/or providing objects 216 that meet the search criteria and the conditions. Optionally or alternatively, referring to index 202 and group 220 is performed piecewise, such repeatedly locating an object that meets the search criteria and filtering by the conditions. Optionally or alternatively, other variations may be used such as initially locating objects by the conditions and then finding whether the located objects meet the search criteria.

In some embodiments, index 202 and group 220 are linked therebetween and query 232 and inquiry 236 are provided together to obtain filtered objects such as objects 216.

Thus, generally, filter 210 enables to identify objects by an intersection of the search criteria and conditions for attributes.

It is noted that, in some cases, objects 212 and/or objects 216 stand for one object or no objects, that is, no object met the search criteria and/or no object was filtered out by filter 210.

In some embodiments, a plurality of instances of a store 222 is combined in one instance of store 222 that holds a plurality of kinds of attributes. In some embodiments, index 202 and group 220 are combined in one expanded structured.

In some embodiments, index 202 and/or store 222 are organized in a database, optionally incorporating the object index and the attributes in the same database, or the object index and the attributes are stored in databases that are linked therebetween.

FIG. 3 schematically illustrates a computer 300 having a screen 330, a pointing and activation device such as a mouse (not shown), and a program or programs for displaying representations of objects and activation of the corresponding objects, the program or programs further capable or adapted to communicate or interact with owners of the objects or part thereof, according to exemplary embodiments of the disclosed subject matter. Screen 330 of computer 300 is also illustrated in an expanded form.

Screen 300 schematically illustrates representations of objects, denoted as O1 . . . On, identified in a search according to search criteria and an attribute, by way of example the attribute is permissions of a user, the user denoted as U1.

Representations of objects O1 . . . O6 for which user U1 have access rights, illustrated schematically by symbols, such as a symbol 310, are displayed on screen 330. The symbols embed or link to objects O1 . . . O6 or embed links to objects O1 . . . O6.

Responsive to activation, for example, of symbol 310 representing object O1, object O1 is accessed. The view on screen 330 changes, as indicated by arrow 350, and object O1 is displayed. For example, if object O1 is a textual document, the document is displayed on screen 330, as schematically illustrated by a text document 340.

In some embodiments, an indication for objects that have met the search criteria but for which the user does not have sufficient access rights is presented on screen 330. The indication is by a message or a symbol or other graphical construct, shown schematically as a symbol 320.

Responsive to activation of symbol 320, the owner or owners, collectively also as owners, of the objects for which user U1 does not have sufficient access rights are notified that access rights are requested for the objects for which user U1 does not have sufficient access rights. Responsively, the owners may grant access rights to particular objects as described above.

In some embodiments, the identified objects are presented or ranked on screen 300 according to one or more attributes of the objects. For example, the presentation on screen 300 is ordered according to the activity history by user U1, the most accessed objects appearing first, or according to permissions of user U1 with respect to the objects. As another example, the presentation on screen 300 is ordered according to a combination of activity history and permissions, potentially providing user U1 to view or check objects to which user U1 has access rights and with activity above and/or below a certain level.

In some embodiments, users that have appropriate authority or rights may objects that relate to other users. For example, objects are identified according to recent activity by all users, or a sub-set of users, and presented according to the activity, optionally grouped by users that accessed the objects, thus potentially enabling security personnel to have a synopsis of abnormal activity. Furthermore, for example, presenting objects according to both confidentiality and activity potentially provides a synopsis for tracking illicit access to confidential contents.

Optionally, the presentation is in some structure such as a hierarchical structure by the owners of the objects, for example, owners of top management appearing above owners of lower levels with public objects appearing last.

In some embodiments, in searching for objects in the enterprise, one or more search criteria may be used to find or identify or match objects for presentation to a user.

In some embodiments, in addition to plain search criteria as a textual keywords or phrases, in some embodiments, the search criteria are composed of logical and/or other relations between textual phrases, such as 'And', 'Or' or 'Not', 'Greater', or 'Subset of', 'vicinity of', etc. Optionally or additionally, wildcard symbols may be used that encompass multiplicity of words or phrases. For example, the regular expression as known in the art that provides a concise and flexible means for matching strings of text.

It is noted that the matching is by contents of the objects and/or attributes and/or other data related to the objects, such as permissions or classification.

Furthermore, in some embodiments, the search criteria comprise rules that are used for matching objects, wherein the rules provide conditions that apply to the contents of the objects and/or attributes thereof and/or other characteristics such as capabilities or histories of the objects.

In some embodiments, the rules use special operators and enterprise qualifiers.

Some illustrative examples of conjured fictional rules are provided below in order to convey the nature of the rules.

(a) ("product" Vicinity 5 "release") And Not History ('sent by mail')

(b) "secret" OR "confidential" Accessible (Domain ('users') OR Domain ('public'))

(c) <regex> Class 'sensitive' Size Greater 15 MB (d) "meeting*" Vicinity 2 "note*" Accessible Group ('admin') And Archived (Less 3 'Month')

By way of example, the latter rule (d) implies locating objects containing the term "meeting" or "meetings" which is separated by 2 or less words from the term "note" or "notes", wherein the objects are accessible by users in the group 'admin' and wherein the objects were archived less than 3 months ago.

Thus, when a user applies rules in queries for objects, objects that meet the rules conditions are identified, the index is interrogated for the selected objects to retrieve the user's permissions and/or other attributes for the objects, and the results are presented, as described above, for example, with respect to FIG. 3.

The terms Vicinity, Accessible', Group, Archived, Less, History, Domain and the like are operators interpretable and operable by a program or programs of the enterprise, and the terms 'admin', 'public' and the like are qualifiers of the enterprise and used, at least partly, as parameters for the operators.

In some embodiments, the storage of the enterprise is implemented in or as a database and/or interfaced as a database, and a query language such as SQL may be used instead of and/or complementing the rules' syntax, vocabulary and implementation and/or support thereof.

FIG. 4 outlines operations for a secure search, according to exemplary embodiments of the disclosed subject matter.

In operation 402 objects in and/or on a storage of a computerized system, such as an enterprise, are searched for according to search criteria provided by a user. The search criteria comprise, at least one attribute of the objects, in some embodiments, the attribute is permissions of a user with respect to the objects.

In some embodiments, the criteria comprise further elements. For example, textual keywords and/or phrases and/or logic and/or rules, the rules comprising, for example, attributers of objects and/or operators and/or qualifiers of the computerized system.

In operation 404 objects that meet the criteria are identified, and are, optionally, selected and/or marked for further reference.

In operation 406 a representation or representations of identified objects that are accessible to and/or by the user are displayed or otherwise presented to the user. Optionally, the display is according to an attribute of the objects such as permissions or owners, and is further optionally arranged according to the attribute such as in a hierarchical order.

Optionally, in operation 408, an indication that objects that are not accessible to a user have met the criteria is presented. The user may be granted by an owner of the objects that are not accessible to a user access rights responsive to activation of the indication. For example, upon activation of the indication, the owner is notified that the user requests access rights, and responsively the owner may grant the rights such as by communicating with the user by email or other methods such as SMS or any other method.

In some embodiments, a representation of an object comprises a symbol and/or other label or a text that identifies the represented object and by which the object is accessible, at least potentially.

The representation of an object is displayed, such as on a display device connected or linked to a computer.

Responsive to activating a representation of an object to which the user has access rights, the user may access the object such as opening the object for viewing.

In some embodiments, the activation of a representation of an object is carried out by pointing and operating on the representation, such as by pressing 'Enter' key of a double-click with the computer mouse or other pointing device. In some embodiments, the activation is responsive to an event rather than actual activation with a pointing device, such as displaying the object responsive to presenting a representation thereof.

Whether an object is accessible to a user is determined according to permission of the user with respect to the object. Permissions or access rights of the user to an object are retrieved from a resource of the computerized system that has and/or is indicative of permissions of users to objects, such as a previously prepared index as described, for example, above.

There is thus provided according to the present disclosure a method for a secure search in a computerized system having a storage, comprising searching for objects in the storage of the computerized system according to search criteria provided by a user wherein the criteria comprising at least one attribute of the objects, identifying objects that meet the criteria and displaying representations respective of identified objects that are accessible to the user.

In some embodiments, the criteria comprise at least permissions of the user with respect to the objects, and the identified objects that are accessible to the user are determined according to permissions of the user with respect to the identified objects.

In some embodiments, the permissions of the user with respect to the identified objects are obtained by exploring the storage of the computerized system and identifying objects and respective permissions for users of the computerized system.

In some embodiments, the objects and respective permissions for users of the computerized system are indexed for subsequent retrieval for determining whether the identified objects are accessible to the user.

In some embodiments, the method further comprises activating at least one of the representations of identified objects that are accessible to the user, thereby accessing the respective object.

In some embodiments, the method further comprises displaying an indication that an at least one identified object is not accessible to the user.

In some embodiments, responsive to activation the indication, an entity authorized to grant access to the at least one identified object that is not accessible to the user is notified.

In some embodiments, responsive to the notification the user is granted, by the entity, rights for accessing the at least one identified object that is not accessible to the user.

There is further provided according to the present disclosure an apparatus for a secure search, comprising a computerized system comprising an at least one computer and an at least one data storage device, and an at least one program operative in the computerized system and configured for:

searching for objects in the at least one data storage device according to search criteria provided by a user, the criteria comprising at least one attribute of objects;

identifying objects that meet the criteria; and displaying representations of identified objects that are accessible to the user.

In some embodiments, the criteria comprise at least permissions of the user with respect to the objects.

In some embodiments, the at least one program is further configured for activating at least one of the representations of identified objects that are accessible to the user, thereby accessing the respective object.

In some embodiments, the at least one program is further configured for displaying a representation of an at least one identified object that is accessible to the user.

In some embodiments, the at least one identified object that is accessible to the user is accessible responsive to activation the representation thereof.

In some embodiments, the at least one program is further configured for displaying an indication of an at least one identified object that is not accessible to the user.

In some embodiments, responsive to the notification the user is granted, by the entity, rights for accessing the at least one identified object that is not accessible to the user.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable to controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a similar one denotes an apparatus having one or more processors operable or operating according to a program.

The term "configuring" and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function (s). It should also be noted that, in some alternative implementations, illustrated operations may occur in deferent order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

As used herein the term "configuring" and/or 'adapting' for an objective, or a variation thereof, implies using materials and/or components in a manner designed for and/or implemented and/or operable or operative to achieve the objective.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for a secure search in a computerized system having a storage, comprising:
    searching for objects in the storage of the computerized system according to search criteria provided by a user, the criteria comprising at least permissions of the user with respect to the objects;
    identifying objects that meet the criteria;
    filtering the objects that meet the criteria according to an at least one condition, thereby selecting objects that meet the criteria and the at least one condition;
    displaying representations respective of identified objects that are selected and accessible to the user based on permissions of the user with respect to the identified objects, the representations are displayed according to a ranking order based on an at least one attribute of the identified objects that are selected and accessible to the user;
    separately displaying an indication of an at least one another object that is identified as not accessible to the user, and
    activating the indication, thereby notifying an entity authorized to grant access to the at least one another object that the user requests access to the at least one another object,
    wherein the method is carried, out by an at least one computer of the computerized system configured to perform the method.

2. The method according to claim 1, wherein the permissions of the user with respect to the identified objects are obtained by exploring the storage of the computerized system and identifying objects and respective permissions for users of the computerized system.

3. The method according to claim 2, wherein the objects and respective permissions for users of the computerized system are indexed for subsequent retrieval for determining whether the identified objects are accessible to the user.

4. The method according to claim 1, further comprising activating at least one of the representations of identified objects that are accessible to the user, thereby accessing the respective object.

5. The method according to claim 1, wherein responsive to the notification the user is granted, by the entity via communications from outside the computerized system, rights for accessing the at least one identified object that is not accessible to the user.

6. The method according to claim 1, wherein the displayed representations of the identified objects that are accessible to the user are ranked according to one or more attributes of the objects.

7. The method according to claim 1, wherein the at least one attribute comprises a plurality of attributes.

8. The method according to claim 1, wherein the at least one attribute of the objects comprises any one of a classification of the objects, owner of the objects, permissions of users of the objects, access history of the objects, activities of the objects; confidentially of the objects, or sensitivity of the objects.

9. The method according to claim 1, wherein the objects are identified according to an at least one rule.

10. The method according to claim 1, wherein the ranking order is hierarchical.

11. The method according to claim 1, wherein the at least one condition relates to activity history of the objects.

12. An apparatus for a secure search, comprising:
a computerized system comprising an at least one computer and an at least one data storage device; and
an at least one program operative in the computerized system and configured for:
searching for objects in the at least one data storage device according to search criteria provided by a user, the criteria comprising at least permissions of the user with respect to the objects;
identifying objects that meet the criteria;
filtering the objects that meet the criteria according to an at least one condition, thereby selecting objects that meet the criteria and the at least one condition;
displaying representations of identified objects that are selected and accessible to the user based on permissions of the user with respect to the identified objects, the representations are displayed according to a ranking order based on an at least one attribute of the identified objects that are selected and accessible to the user;
separately displaying an indication of an at least one another object that is identified as not accessible to the user, and
responsive to activation of the indication, notifying an entity authorized to grant access to the at least one another object that the user requests access to the at least one another object.

13. The apparatus according to claim 12, wherein the at least one program further configured for activating at least one of the representations of identified objects that are accessible to the user, thereby accessing the respective object.

14. The apparatus according to claim 12, wherein the at least one program further configured for displaying a representation of an at least one identified object that is accessible to the user.

15. The apparatus according to claim 14, wherein the at least one identified object that is accessible to the user is accessible responsive to activation the representation thereof.

16. The apparatus according to claim 12, wherein responsive to the notification the user is granted, by the entity via communications from outside the computerized system, rights for accessing the at least one identified object that is not accessible to the user.

17. The apparatus according to claim 12, wherein the at least one program operative in the computerized system is further configured for ranking the representations of the identified objects that are accessible to the user according to one or more attributes of the objects.

18. The apparatus according to claim 12, wherein the at least one attribute comprises a plurality of attributes.

19. The apparatus according to claim 12, wherein the at least one attribute of the objects comprises any one of a classification of the objects, owner of the objects, permissions of users of the objects, access history of the objects, activities of the objects, confidentially of the objects, or sensitivity of the objects.

20. The apparatus according to claim 12, wherein the objects are identified according to an at least one rule.

21. The apparatus according to claim 12, wherein the ranking order is hierarchical.

22. The apparatus according to claim 12, wherein the at least one condition relates to activity history of the objects.

* * * * *